Feb. 19, 1929.  
J. CZORTKOWSKI  
1,702,465  
FUR DRESSING MACHINE  
Filed Jan. 12, 1927
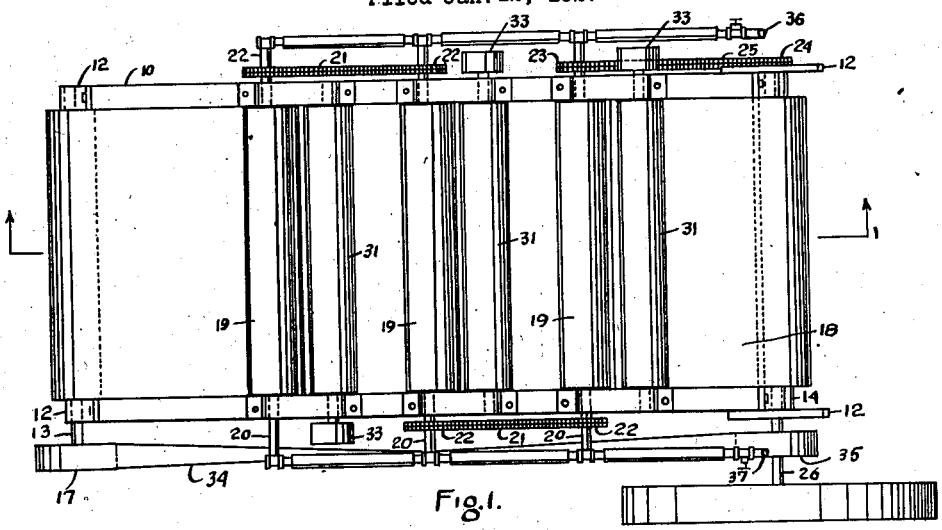
Fig.1.
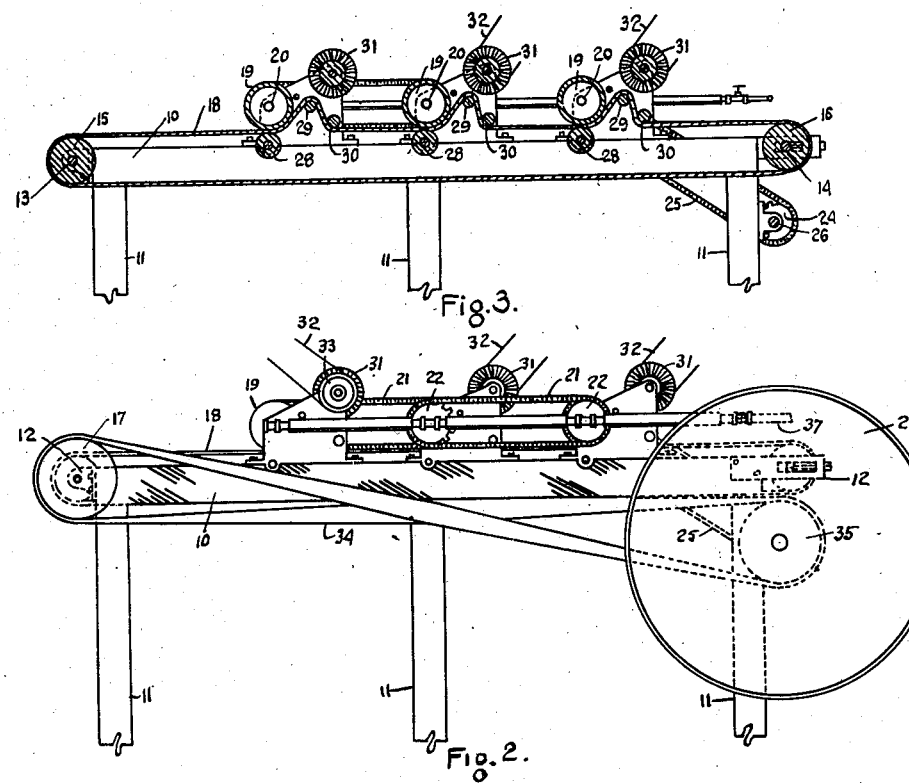
Fig.3.
Fig.2.
Inventor  
J. Czortkowski  
by Featherstonhaugh  
Attorney.

Patented Feb. 19, 1929.

1,702,465

UNITED STATES PATENT OFFICE.

JOHN CZORTKOWSKI, OF ST. JOHNS, QUEBEC, CANADA, ASSIGNOR TO VANDERWEGHE LIMITED, OF MONTREAL, CANADA.

FUR-DRESSING MACHINE.

Application filed January 12, 1927. Serial No. 160,663.

The invention relates to a fur dressing machine, as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to eliminate the laborious methods employed at the present time for straightening out the hair of curly or crinkled fur; to insure every protection for the skin while the pelt is being combed out; to save the expense of labor in the production of the straight haired skin from a curly or crinkled hair skin, and at the same time effect a better result in a more efficient manner; and generally to provide a machine that will automatically straighten out the hairs of skins and deliver them in fit condition for the purpose to which they are to be applied.

In the drawings, Figure 1 is a plan view of the machine used for the purpose of this invention.

Figure 2 is a side elevation of the machine.

Figure 3 is a longitudinal sectional view of the machine on the line 1—1 in Figure 1.

Like numerals of reference indicate corresponding parts in the various figures.

Referring to the drawings, the frame 10 of the machine is supported on the standards 11, and the bearings 12 project from the ends of said frame 10.

The shafts 13 and 14 carrying the rollers 15 and 16 and the driving pulley on the shaft 13 are journalled in the bearings 12, and the canvas endless carrier 18 is mounted on said rollers 15 and 16 and driven through the pulley 17.

The steam drums 19 are mounted on the shafts 20 and driven through the connecting chain 21 and sprockets 22 from the sprocket 23 connected to the main sprocket 24 by the chain 25, the main sprocket 24 being mounted on the driving shaft 26, journalled in bearings from the standard, and itself driven through the pulley 27 and a suitable belt connection.

The steam drums 19 are supported in their bearings in the machine frame above the canvas endless carrier 18, and the rollers 28 also journalled in the frame of the machine come into engagement with the steam drums 19 through the canvas carrier 18, in other words, the carrier 18 passes through the several sets of drums and rollers.

The slack of the carrier is taken up by the rollers 29 just beyond the steam drums 19, and these rollers 29 raise the carrier at these points, so that it partially surrounds the heated drums and brings the skin on its hairy side into contact with the heating surface of the drum for approximately one third of its circumferential periphery.

The canvas carrier on the other side of the rollers 29 is brought down under the rollers 30, but in passing along it is combed by the rotary wire brush 31 driven by the belt 32 around the pulley 33.

The driving pulley 17 is connected by the belt 34 to a pulley 35 on the main shaft 26.

It will be seen from the drawings that there are three sets of heating drums and combing wire brushes and accompanying rollers, though there may be as many sets as required; in some cases these sets of drums and brushes may be reduced in number, and for other work they may be increased in number as found desirable.

In so far as the steam feed is concerned, the inlet pipes 36 are shown on the one side connected to the hollow shafts of the steam drums and the outlet pipes 37 are shown on the other side connected by hollow shafts to the steam drums, so that the said heating drums can be kept at a proper temperature throughout the process of dressing the hair of the skins.

The rollers 15 and 16 are preferably covered with rubber so that the canvas carrier 18 has a very good grip of each roller, and therefore is efficient in bringing the skins through the combing process.

The skins having curly or crinkled hair are laid on the apron portion of the endless carrier, so that they feed in between the first heating drum and the roller thereunder. This has the effect of heating the skin and particularly the hair as it comes in contact with the periphery of the drum and as it leaves said drum the contiguous wire brush, which is rotating at a reasonable speed combs out the hair which has been thoroughly heated and the result of this is that much of the curl is straightened out. The skin continues under the next drum and roller and is again combed out after heating, so that by the time the hair passes the second roller it is in a substantially straight condition, but to finish, it is found preferable to pass it through a third set of drums, rollers and combing brush, and this insures a straight haired skin, and thus accomplishes the purpose of the invention. As has been said before the three sets of heaters and rotary combs have been found sufficient for most of the skins requiring heating, but it is not by any means limited to number, for some skins may require more heating and combing, and others may do with less, according to the condition of the hair.

The ordinary process which has been in use for many years is slow and laborious, as for example they first heat the fur by means of electric irons, and then comb it out by hand in its heated condition, but naturally much heat is lost before it reaches the combing stage and there is not by any means the same efficiency attained as in a machine where it passes directly from the heater or rotary iron to the combing brush.

Of course it is not desirable that this hair straightening process should be limited to the use of drums or rotary arms heated by steam, as any method of heating may be employed, such as by electricity, and furthermore the application through drums is not essential for these heaters may take many other forms, the essential feature being in automatically applying the heat to the hair of the skin immediately preceding the combing process, the skins being in continuous passage through the heater and comber, thereby insuring the greatest dispatch in the treatment of the hair and effecting considerable economy in the production of the straight haired skin from curly or crinkled hair skin.

What I claim is:—

1. In a fur dressing machine, a rotary heater suitably operated, a contiguous rotary combing member coincidently operated and an endless carrier passing under said heater and comber and adapted to bring the skin into close contact and engagement respectively therewith.

2. In a fur dressing machine, a frame supporting a plurality of bearings, an endless carrier mounted on rollers suitably driven, a drum suitably heated and journalled in bearings above said carrier, a rotary brush having stiff combing bristles and supported behind said drum, means for directing the carrier from said drum to said finishing brush, means for driving said drum and means for driving said brush.

3. In a fur dressing machine, a frame supported on standards and having a plurality of bearings above, below and at the ends of said frame, an endless carrier mounted on rollers journalled in bearings at the ends of said frame and driven from one of said rollers, a plurality of sets of heating drums and combing brushes and accompanying rollers journalled in bearings above said frame and carrier, a main drive operating said drums and carrier and means for driving said brushes.

4. In a fur dressing machine, a frame supported on standards and having a plurality of bearings above, below and at the ends of said frame, an endless carrier mounted on rollers journalled in bearings at the ends of said frame and driven from one of said rollers, a plurality of sets of heating drums having steam inlets connected to a steam supply and steam outlets at their other ends and combing brushes and accompanying rollers journalled in bearings above said frame and carrier, a main drive operating said drums and carrier and means for driving said brushes.

5. In a fur dressing machine, a frame supported on standards and having a plurality of bearings above, below and at the ends of said frame, an endless carrier mounted on rollers journalled in bearings at the ends of said frame and driven from one of said rollers, a plurality of sets of heating drums, steam heated and having accompanying rollers under said carrier, and combing brushes with directing rollers adjacent thereto, a main drive operating said drums and carrier and means for driving said brushes.

6. In a fur dressing machine, a frame supported on standards and having a plurality of bearings above, below and at the ends of said frame, an endless carrier mounted on rollers journalled in bearings at the ends of said frame and driven from one of said rollers, a plurality of sets of heating drums steam heated and rotating on said carrier and held in operating relation therewith by guide rollers under the carrier and combing brushes, each brush being in the rear of and higher than its respective drum with directing rollers thereto and therefrom, a main drive operating said drums and carrier and means for driving said brushes.

7. In a fur dressing machine, a frame having a plurality of bearings, a plurality of ironing heated members suitably mounted and operated over said frame, wire brushes for combing the hair of the skin after ironing and heating and rotating adjacent thereto, means for transporting the skins to and through said ironing members and brushes and means for directing the transporting means to and from the brushes after ironing.

8. A machine for ironing furs, comprising a rotating steam cylinder, a rotatable brush element operating in proximity to said steam cylinder, a movable carrier adapted to carry skins past said cylinder and said brush for engagement thereby, and a supporting element positioned within said carrier in parallel relation to said cylinder and adapted to resist the pressure on said carrier during the passage of the skins past said cylinder.

Signed at Montreal, Canada, this 22nd day of December, 1926.

JOHN CZORTKOWSKI.